United States Patent [19]
Suppanz et al.

[11] Patent Number: 6,014,013
[45] Date of Patent: Jan. 11, 2000

[54] BATTERY CHARGE MANAGEMENT ARCHITECTURE

[75] Inventors: Bradley J. Suppanz, Mountain View; Aaron J. Mendelsohn, Campbell; Michael J. McVey, Palo Alto, all of Calif.

[73] Assignee: Space Systems/Loral, Inc., Palo Alto, Calif.

[21] Appl. No.: 09/213,065

[22] Filed: Dec. 16, 1998

[51] Int. Cl.$^7$ .................................................. H02J 7/00
[52] U.S. Cl. ............................................ 320/122; 320/120
[58] Field of Search .................................. 320/122, 118, 320/120, 119

[56] References Cited

U.S. PATENT DOCUMENTS

| | | | |
|---|---|---|---|
| 5,459,671 | 10/1995 | Duley | 320/DIG. 21 |
| 5,578,914 | 11/1996 | Morita | 320/122 |
| 5,656,915 | 8/1997 | Eaves | 320/118 |

OTHER PUBLICATIONS

National Semiconductor News Release: "Industry's First Lithium Ion Battery Charge Controller", Apr. 12, 1996, 2 pages.
National Semiconductor Document, "LM3420 Handles Charging, End–of–Charge Control for Li–Ion Batteries", undated but publicly transmitted on May 20, 1997, 1 page.
EDN Magazine, "Proper handling helps make the most of Li–on batteries", Dec. 5, 1996, pp. 179–190.

*Primary Examiner*—Peter S. Wong
*Assistant Examiner*—Lawrence Luk
*Attorney, Agent, or Firm*—Perman & Green, LLP

[57] ABSTRACT

A system for managing the operation of a battery such as a lithium ion battery having a plurality of serially connected individual cells comprises a bypass module electrically in parallel with each individual cell or, alternatively, with at least one of the cells or alternatively again with an individual cell and its associated grouping of one or more parallel cells. The module includes a sensor for detecting an operating condition of its associated cell and a charger operable for charging the cell. A charge controller is electrically connected with each bypass module and is operable in response to an operating condition of a cell detected by the sensor which is outside a predetermined range of magnitudes to change the bypass module to the conductive mode and thereby shunt current around the battery cell, while leaving unaffected each of the remaining cells. The charge controller includes a processor with mode selecting means for initiating operation of the charger for charging each of the plurality of cells, and a capability for establishing voltage and current set points for each of the bypass modules to thereby prevent overcharging of each associated cell. The processor is also operable for performing a multi step charge profile for each of the bypass modules such that when a predetermined voltage is achieved at the conclusion of a step, a subsequent step is performed at a reduced charge current until a final predetermined voltage is achieved at a charge current which has been reduced to zero.

15 Claims, 2 Drawing Sheets

BATTERY CHARGE MANAGEMENT ARCHITECTURE

BACKGROUND OF THE INVENTION

1. Field of the Invention

The present invention relates generally to battery charging techniques and, more particularly, to managing the charge of a battery system by utilizing individual cell charge/bypass units. The architecture provided by the invention protects the battery from overcharge, overvoltage, overcurrent, and open circuit while allowing the battery assembly to provide normal functioning in the event of any single point failures.

2. Description of the Prior Art

While the present invention is not limited to lithium ion batteries, it has a particular benefit when applied to their use because of their unique operating characteristics. Lithium ion batteries are rapidly becoming the power source of choice for space applications. They exhibit the highest concentrations of available power both per unit volume and per unit weight of any known battery and can store more energy than NiCd, nickel-metal hydride (NiMH), and other rechargeable types.

Because of one of their unique operating characteristics, lithium ion battery cells require careful charge management to ensure that significant over charge does not occur. This is for the reason that lithium ion batteries possess an extreme sensitivity to overcharging not found in most other types of batteries. Such charge management is achieved by limiting the maximum voltage to which the cell is charged. In order to achieve the maximum possible energy stored in the cell while limiting the over charge, a device is required that controls the voltage. Also, in many applications, if a cell opens, then the whole battery would be lost. It is desirable to allow a cell to be completely bypassed if it fails in this manner. The ability to monitor temperature and adjust the maximum charge voltage accordingly is also desirable. A feature to allow varying the charge voltage setpoint from outside the device is also desired.

Previous battery cell management devices for nickel hydrogen or nickel cadmium cells typically used diodes or a relay device to short out failed cells. These earlier battery technologies were not as sensitive to over charge as lithium ion cells and consequently did not require devices to precisely control each individual cell voltage.

Other known prior art includes the approach typically used by automotive applications that are presently under development. The approach used is to connect a relay in series with a fixed resistor that is connected around the cell. Some appropriate circuit or computer is used to monitor battery voltage and closes the relay when a voltage limit is reached. The resistor is set to shunt current around the cell so that it stops charging. This approach is inexpensive and simple but does not provide optimal charge control and may reduce battery life.

It was in light of the state of the technology as just discussed that the present invention was conceived and has now been reduced to practice.

SUMMARY OF THE INVENTION

A system for managing the operation of a battery such as a lithium ion battery having a plurality of serially connected individual cells comprises a bypass module electrically in parallel with each individual cell or, alternatively, with at least one of the cells or alternatively again with an individual cell and its associated grouping of one or more parallel cells. The module includes a sensor for detecting an operating condition of its associated cell and a charger operable for charging the cell. A charge controller is electrically connected with each bypass module and is operable in response to an operating condition of a cell detected by the sensor which is outside a predetermined range of magnitudes to change the bypass module to the conductive mode and thereby shunt current around the battery cell, while leaving unaffected each of the remaining cells. The charge controller includes a processor with mode selecting means for initiating operation of the charger for charging each of the plurality of cells, and a capability for establishing voltage and current set points for each of the bypass modules to thereby prevent overcharging of each associated cell. The processor is also operable for performing a multi step charge profile for each of the bypass modules such that when a predetermined voltage is achieved at the conclusion of a step, a subsequent step is performed at a reduced charge current until a final predetermined voltage is achieved at a charge current which has been reduced to zero.

Previous approaches have involved the use of mechanical or electronic switches in parallel with a battery cell to bypass current in the event of overcharge conditions. The individual battery charger approach of the invention provides tolerance to any single point failures without allowing overcharge to the battery cell which can result in damage to the battery, even a disastrous explosion. The individual charger approach allows loss of a single cell or charge circuit while allowing the battery assembly to continue to function.

As a result, the invention provides a high level of fault tolerance while minimizing the number of components and thereby reducing cost. The individual chargers will allow special adjustment of voltage and current of individual cells to optimize cell performance while enhancing life without dissipating waste heat.

The approach of the invention comprises the connection of individual chargers to each battery cell in a string of "N" battery cells. The design approach utilizes a "bypass" device to allow the battery assembly to function in the event of an open circuit, battery cell or the loss of a charger. Each charge/bypass device will allow individual control of voltage and current via external control signals. This allows optimization of battery cell charging by varying the external control signals. Additional circuitry is included that prevents the charger from allowing overcharge of the battery in various failure conditions so the device is single point failure tolerant. The charge device can be used to support any charge voltage or current profile as desired. One potential application is to support a two-step charge profile wherein the charger provides a constant current to each cell. When a first desired voltage is reached the circuit reduces the charge current to one-half of the initial setting; when a second desired voltage is reached the charge current is reduced to zero. The inputs to the individual chargers can be operated at any desired voltage. In the envisioned application, the input would be the main spacecraft bus, typically 100V or 50V. Additional circuitry to monitor temperature or other telemetry circuits can be made available In keeping with the invention, one bypass device would be required for each battery cell. Possible implementations might use hybrids, ASICS or a custom integrated circuit design. The bypass device of the invention is applicable to any usage of lithium ion batteries including commercial or automotive applications.

A primary feature of the invention, then, is to provide an improved battery charge management architecture.

Another feature of the invention is to provide such an improved battery charge management architecture which protects the battery from overcharge, overvoltage, overcurrent, and open circuit situations while allowing the battery assembly to provide normal functioning in the event of any single point failures Another feature of the invention is to provide such an improved battery charge management architecture which utilizes individual cell charge/bypass units.

Still another feature of the invention is to provide such a novel technique which utilizes a bypass module electrically in parallel with each individual cell including a sensor for detecting an operating condition of the cell and a charger operable for charging the cell and a charge controller electrically connected with each of the bypass modules, the charge controller being operable in response to an operating condition of a cell detected by the sensor which is outside a predetermined range of magnitudes to change the bypass module to the conductive mode and thereby shunt current around the battery cell, while leaving unaffected each of the remaining cells.

Yet another feature of the invention is to provide such a novel technique wherein the charge controller includes a processor with mode selecting means for initiating operation of the charger for charging each of the plurality of cells.

Still a further feature of the invention is to provide such a novel technique wherein the processor includes the capability of establishing voltage and current set points for each of the bypass modules to thereby prevent overcharging of each associated cell.

Yet a further feature of the invention is to provide such a novel technique which guards against overcharging.

Still a further feature of the invention is to provide such a novel technique which is particularly beneficial for lithium ion batteries.

Still another feature of the invention is to provide such a novel technique wherein the processor is operable for performing a multi step charge profile for each of the bypass modules such that when a predetermined voltage is achieved at the conclusion of a step, a subsequent step is performed at a reduced charge current until a final predetermined voltage is achieved at a charge current which has been reduced to zero.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numbers refer to like parts throughout the disclosure.

DETAILED DESCRIPTION OF THE PREFERRED EMBODIMENT

Figure 1:
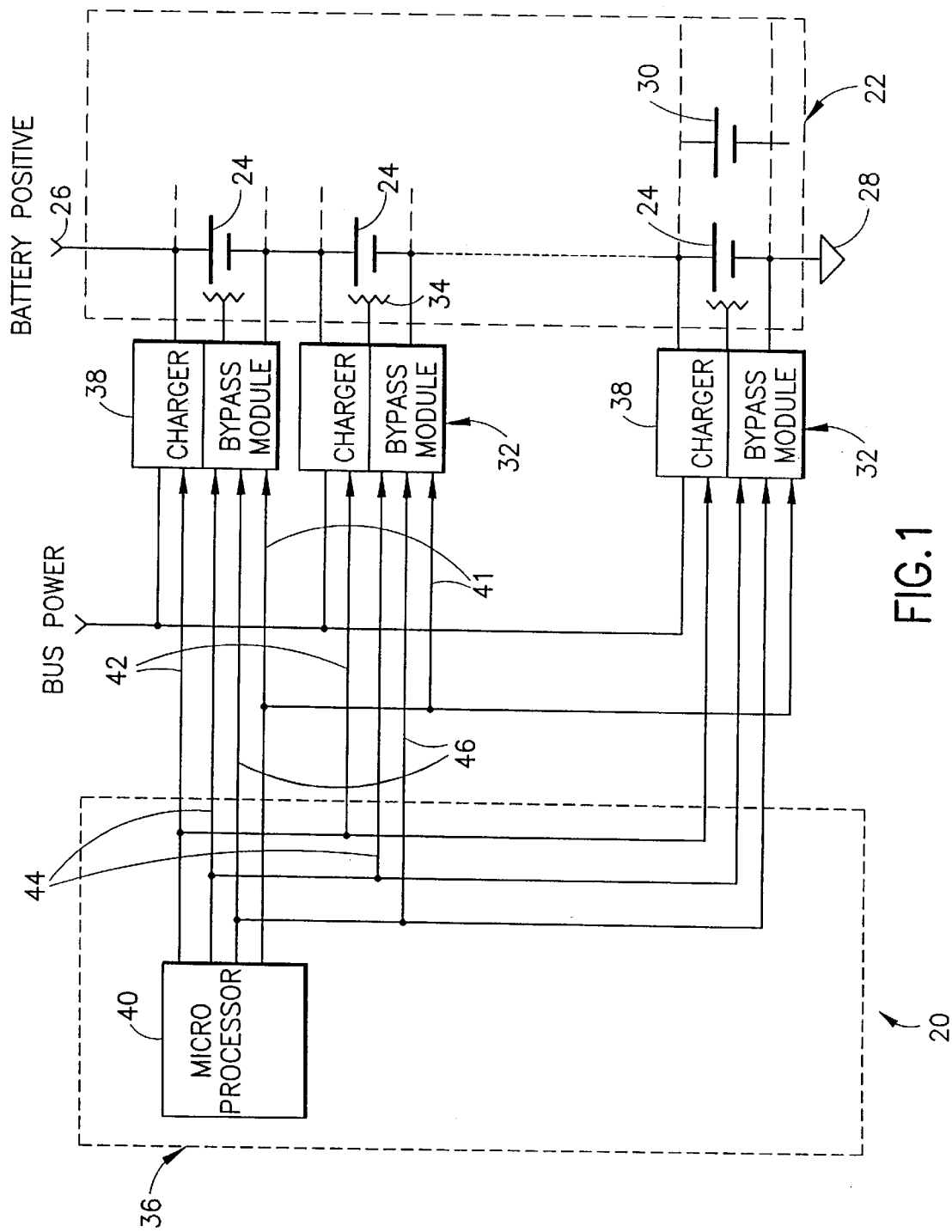
FIG. 1 is a schematic diagram of a battery charging and management system embodying the present invention.

Turn now to the drawing which diagrammatically illustrates a system 20 embodying the present invention for managing the operation of a battery 22 having a plurality of serially connected individual cells 24. It was earlier mentioned that while the invention is not to be so limited, a particularly useful application of the invention is in conjunction with lithium ion batteries which are presently in great demand for powering onboard systems of space vehicles. Hence, in the ensuing description, it will be assumed that the battery 22 is a lithium ion battery.

In the system 20 presented graphically in FIG. 1, the plurality of cells 24 extends between battery positive 26 and battery ground 28 and each cell 24 in the series chain may have one or a plurality of additional cells 30 connected with it in parallel.

A bypass module or device 32 is electrically in parallel with each individual cell 24 or alternatively with at least one of the cells 24 or alternatively again with an individual cell 24 and its associated grouping of one or more parallel cells 30. The bypass module 32 includes a sensor 34 for detecting an operating condition of the associated cell 24 or cell 30. In this regard, the sensor 34 may be of any suitable type capable of detecting, for example, voltage or temperature.

A charge controller 36 is electrically connected with each of the bypass modules 32 and has a conductive mode and a normally non conductive mode. The charge controller is operable to change to the conductive mode when an operating condition of the battery cell exceeds a predetermined value to thereby shunt current around the battery cell. The sensor 34 may be a temperature transducer such as a thermistor for measuring battery cell temperature and a cell temperature comparator such as an operational amplifier is operable to generate a temperature excessive signal when the signal from the temperature transducer exceeds a predetermined value, the charge controller then being operable to change to the conductive mode and thereby shunt current around the battery cell. The sensor may also be a voltage comparator such as an operational amplifier for measuring voltage across the cell, the charge controller being operable in response to a voltage excessive signal to change the charge controller to the conductive mode and thereby shunt current around the battery cell. The charge controller may include a voltage limiting operational amplifier operable for transmitting a voltage excessive output signal when the input thereto exceeds a predetermined value and a transistor having a predetermined gate voltage allowing bypass current flow, the transistor being responsive to the voltage excessive output signal from the voltage limiting operational amplifier to shunt current around the battery cell.

Signals from the sensor 34 are directed to a microprocessor 40 as a component of the charge controller 36 via a telemetry lead 41. Thus, the charge controller is operable in response to an operating condition of a cell detected by the sensor 34 which is outside a predetermined range of magnitudes to change the bypass module 32 to the conductive mode and thereby shunt current around the battery cell 24, while leaving unaffected each of the remaining cells.

Figure 2:
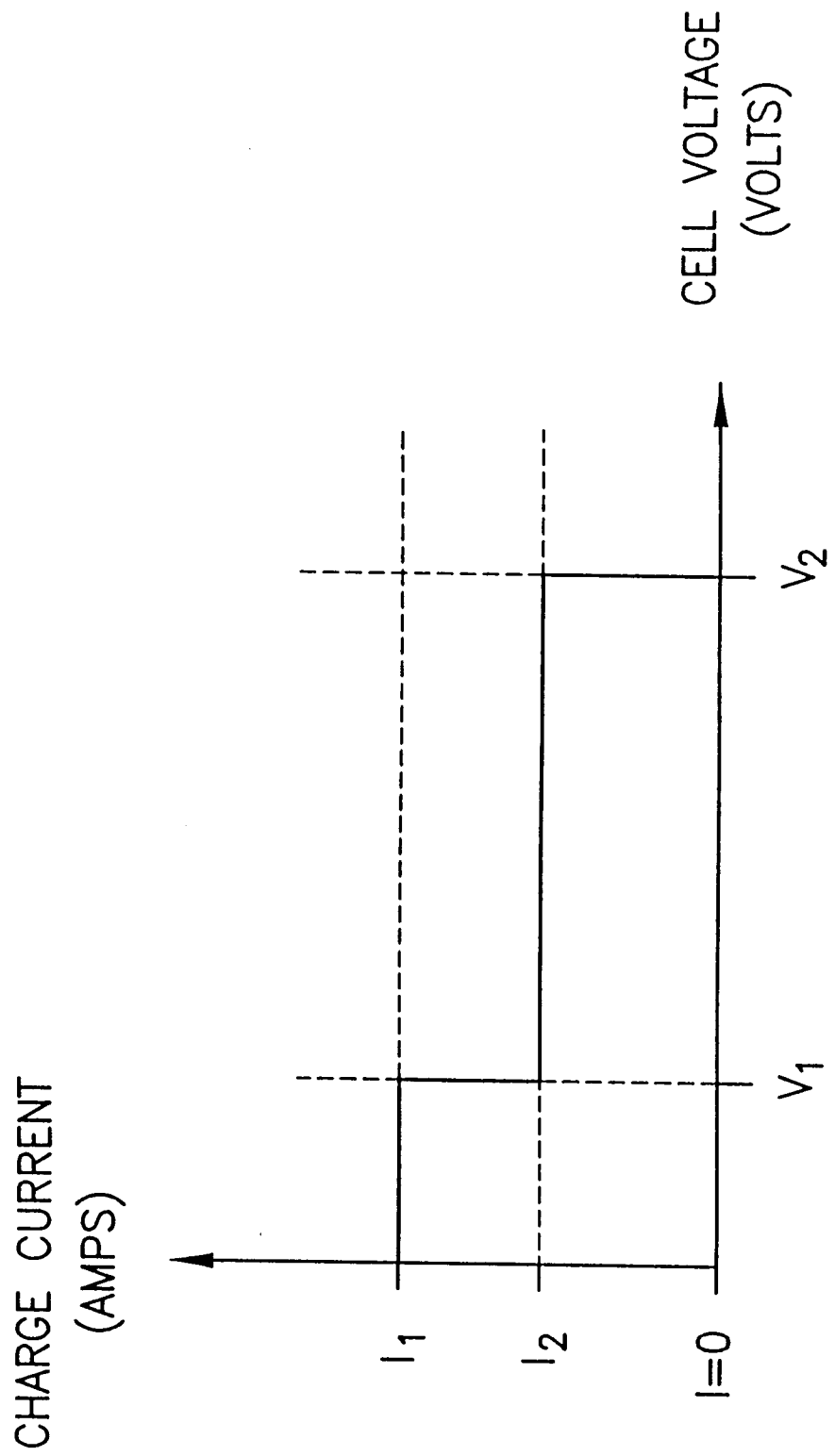
FIG. 2 is a graph depicting a two-step charge profile performed in accordance with the invention.

The bypass module 32 also includes a charger 38 operable for charging the cells 24, 30. Instructions for initiating operation of the charger 38 for charging each of the cells emanate from the microprocessor 40 with mode selecting capability indicated by lead 42. The microprocessor 40 also includes the capability, indicated by leads 44, 46, respectively, of establishing voltage and current set points for each of the bypass modules 32 to thereby prevent overcharging of each associated cell. Indeed, preferably, the microprocessor 40 is operable for performing a multi step charge profile for each of the bypass modules such that when a predetermined voltage is achieved at the conclusion of a step, a subsequent step is performed at a reduced charge current until a final predetermined voltage is achieved at a charge current which has been reduced to zero. See FIG. 2.

While a preferred embodiment of the invention has been disclosed in detail, it should be understood by those skilled in the art that various other modifications may be made to the illustrated embodiments without departing from the scope of the invention as described in the specification and defined in the appended claims.

What is claimed is:

1. A system for managing the operation of a battery having a plurality of serially connected individual cells comprising:

a charger electrically in parallel with each individual cell operable for charging the cell together with a bypass device including sensing means for detecting an operating condition of the cell; and a charge controller electrically connected with each of said bypass devices, said charge controller being operable in response to an operating condition of a cell detected by said sensing means which is outside a predetermined range of magnitudes to change said bypass device to the conductive mode and thereby shunt current around the battery cell, while leaving unaffected each of the remaining cells.

2. A system for managing operation of a battery as set forth in claim 1 wherein said charge controller includes a processor with mode selecting means for initiating operation of said charger for charging each of the plurality of cells.

3. A system for managing operation of a battery as set forth in claim 2 wherein said processor includes means for establishing voltage and current set points for each of said bypass devices to thereby prevent overcharging of each associated cell.

4. A system for managing operation of a battery as set forth in claim 2 wherein said processor is operable for performing a multi step charge profile for each of said bypass devices such that when a predetermined voltage is achieved at the conclusion of a step, a subsequent step is performed at a reduced charge current until a final predetermined voltage is achieved at a charge current which has been reduced to zero.

5. A system for managing operation of a battery as set forth in claim 1 wherein the battery is a lithium ion battery.

6. In combination:

a battery having a plurality of serially connected individual cells;

a charger electrically in parallel with at least one of said individual cells operable for charging the cell together with a bypass device including sensing means for detecting an operating condition of the cell; and a charge controller electrically connected with each of said bypass devices, said charge controller being operable in response to an operating condition of said cell detected by said sensing means which is outside a predetermined range of magnitudes to change said bypass device to the conductive mode and thereby shunt current around said cell, while leaving unaffected each of the remaining cells.

7. A system for managing operation of a battery as set forth in claim 6 wherein said charge controller includes a processor with mode selecting means for initiating operation of said charger for charging each of said plurality of cells.

8. A system for managing operation of a battery as set forth in claim 7 wherein said processor includes means for establishing voltage and current set points for each of said bypass devices to thereby prevent overcharging of each of said associated cells.

9. A system for managing operation of a battery as set forth in claim 7 wherein said processor is operable for performing a multi step charge profile for each of said bypass devices such that when a predetermined voltage is achieved at the conclusion of a step, a subsequent step is performed at a reduced charge current until a final predetermined voltage is achieved at a charge current which has been reduced to zero.

10. A system for managing operation of a battery as set forth in claim 6 wherein said battery is a lithium ion battery.

11. A method of managing the operation of a battery having a plurality of serially connected individual cells comprising the steps of:

(a) connecting a charger electrically in parallel with a plurality of the individual cells operable for charging the cell together with a bypass device including sensing means for detecting an operating condition of the cell, the bypass device normally being in the nonconductive mode;

(b) connecting a charge controller electrically with each of the bypass devices;

(c) sensing an operating condition of a cell which is outside a predetermined range of magnitudes;

(d) in response to step (c), operating the charge controller to change the bypass device to the conductive mode and thereby shunt current around the battery cell, while leaving unaffected each of the remaining cells.

12. A method of managing operation of a battery as set forth in claim 11 wherein the charge controller includes a processor with mode selecting means for initiating operation of said charger for charging each of the plurality of cells.

13. A method of managing operation of a battery as set forth in claim 12 wherein the processor includes means for establishing voltage and current set points for each of the bypass devices to thereby prevent overcharging of each associated cell.

14. A system for managing operation of a battery as set forth in claim 12 wherein the processor is operable for performing a multi step charge profile for each of the bypass devices such that when a predetermined voltage is achieved at the conclusion of a step, a subsequent step is performed at a reduced charge current until a final predetermined voltage is achieved at a charge current which has been reduced to zero.

15. A system for managing operation of a battery as set forth in claim 11 wherein the battery is a lithium ion battery.

* * * * *